June 26, 1956 — C. A. SCHWENDEN — 2,752,514
ELECTRIC MOTOR HOUSING
Original Filed June 14, 1950 — 3 Sheets-Sheet 1
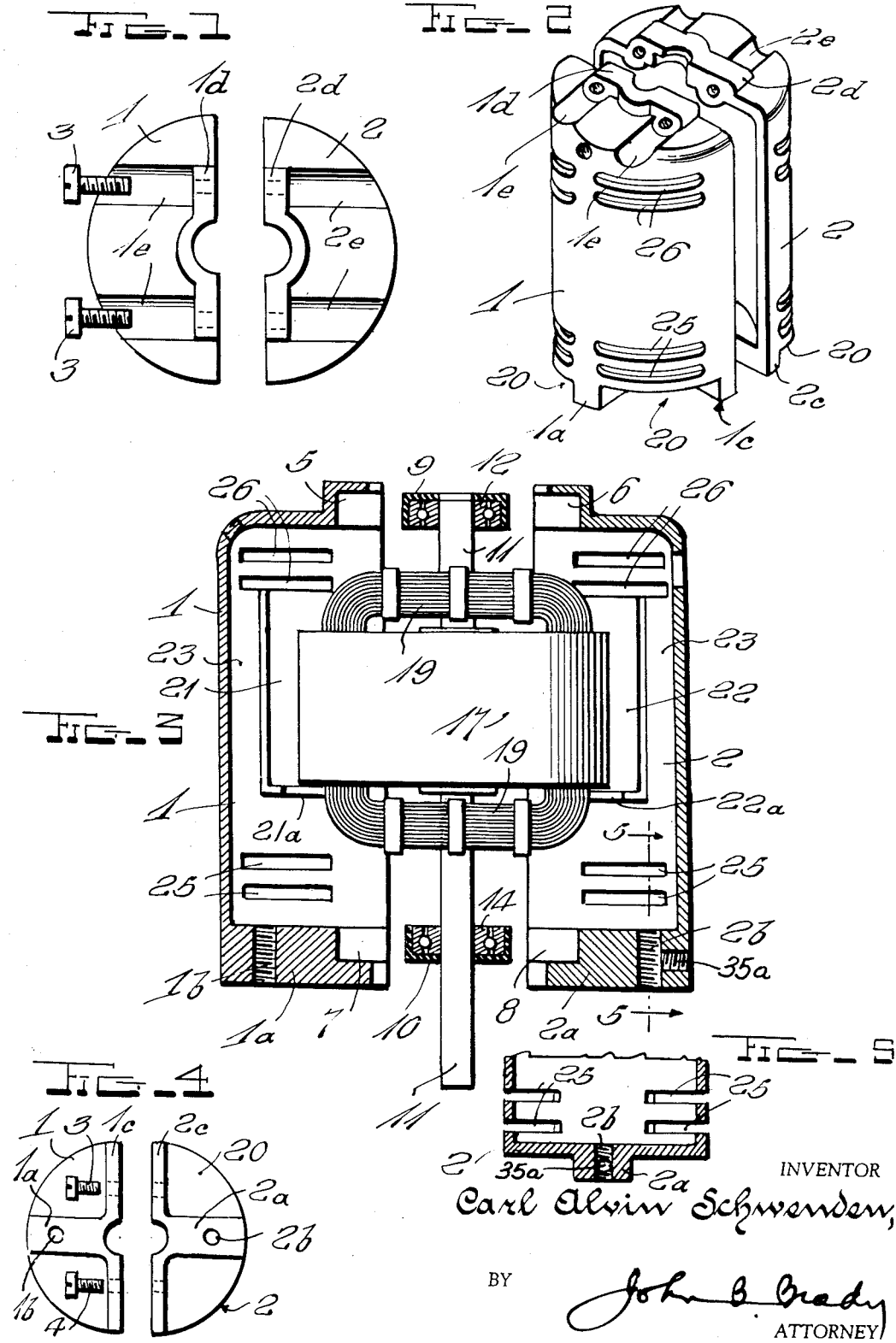
INVENTOR
Carl Alvin Schwenden,
BY John B. Brady
ATTORNEY

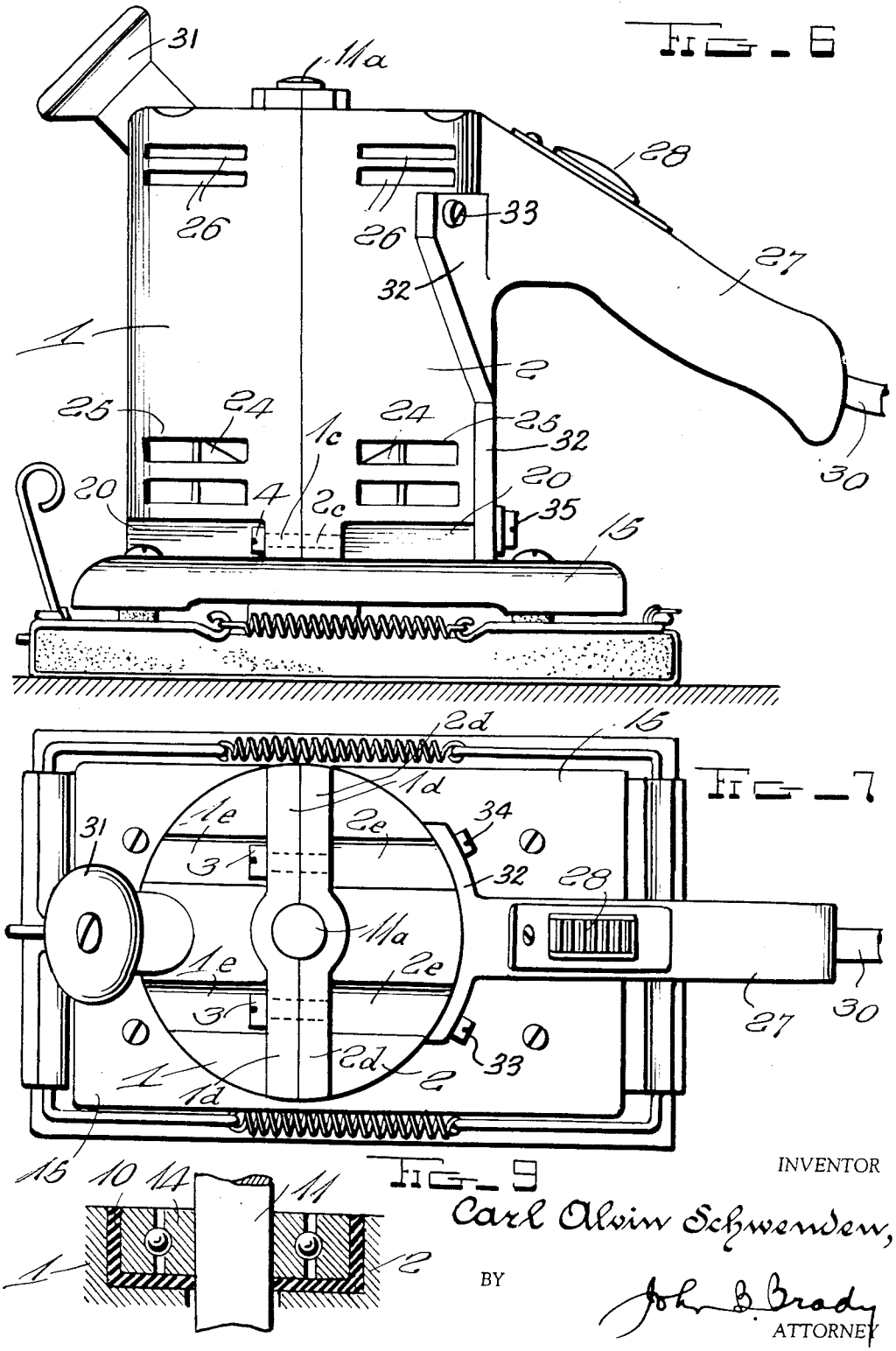

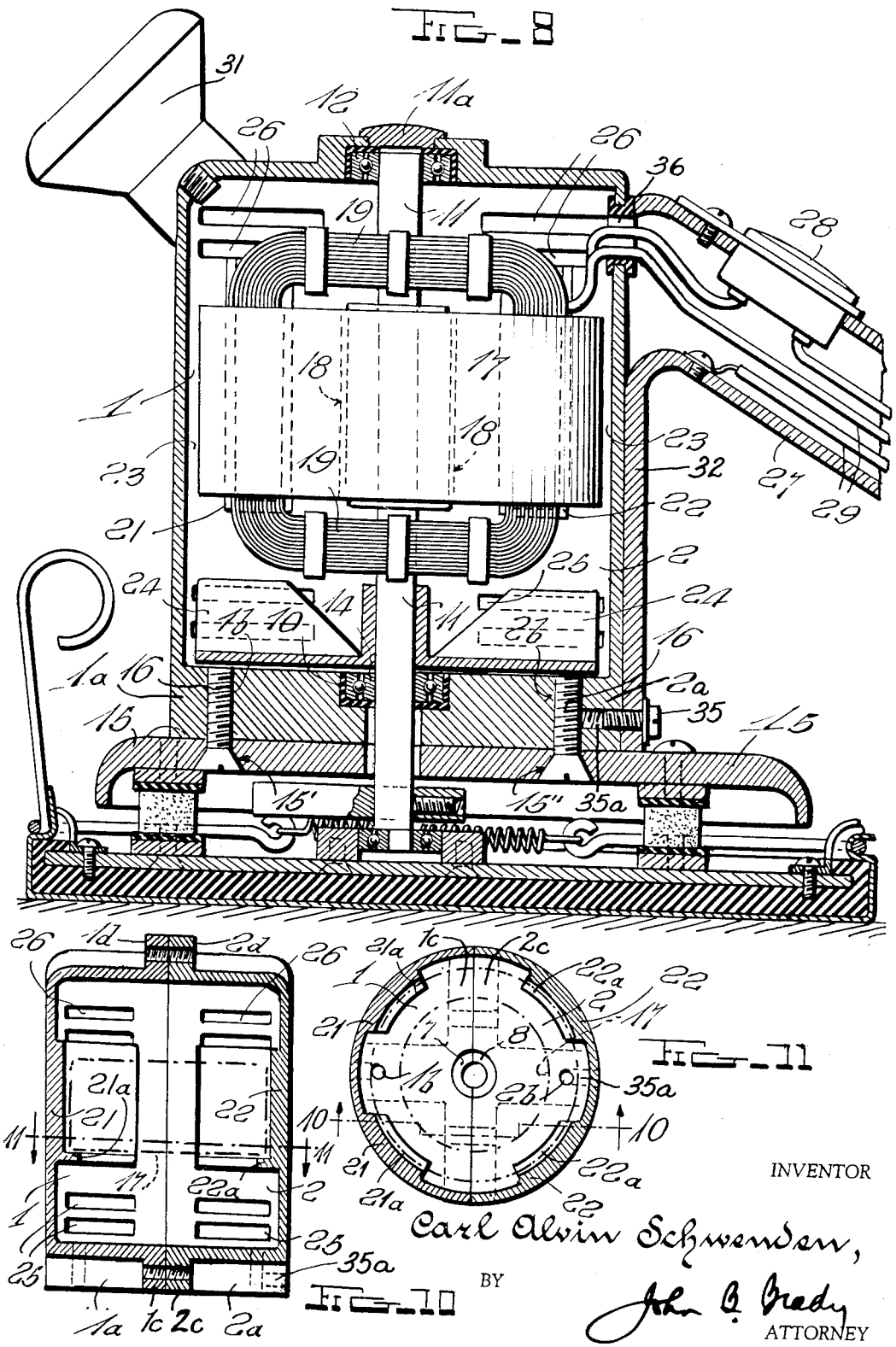

United States Patent Office 2,752,514
Patented June 26, 1956

2,752,514

ELECTRIC MOTOR HOUSING

Carl Alvin Schwenden, Alhambra, Calif., assignor to Junior Tool Company, Azusa, Calif., a corporation of California Original application June 14, 1950, Serial No. 167,995. Divided and this application March 9, 1953, Serial No. 340,995

8 Claims. (Cl. 310—50)

My invention relates broadly to rotative apparatus and more particularly to a construction of a longitudinally split housing for a rotative apparatus.

This application is a division of my application Serial No. 167,995 filed June 14, 1950, for Surface Sanding Machines, now abandoned.

One of the objects of my invention is to provide a construction of longitudinally split housing for enclosing the parts of rotative equipment and journaling the shaft of such equipment.

Another object of my invention is to provide a construction of longitudinally split housing for an electric motor which has accuracy of alignment of its parts without machining, for mass production and assembly and which provides a molded resilient mounting for the bearings of the motor shaft.

Still another object of my invention is to provide a resilient assembly for bearings supported in the longitudinally split casing of a housing for journaling the rotating shaft and for substantially reducing the transmission of vibration from the shaft to the housing.

Still another object of my invention is to provide a construction of longitudinally split housing for electric motors having resilient mounting means for supporting bearings which will substantially dampen the amplitude of the supply frequency impact magnetically induced in the rotor thus reducing the wear on shaft, bearings, and bearing housings.

A still further object of my invention is to provide an assembly of a housing longitudinally split into two coacting parts having means for positively aligning the parts of an electric motor.

Other and further objects of my invention reside in the construction and assembly of a longitudinally split motor housing, as set forth more fully in the specification hereinafter following, by reference to the accompanying drawings, in which:

Figure 1 is an end plan view showing the manner of assembling the two coacting parts of the longitudinally split motor housing;

Fig. 2 is a perspective view of the two coacting parts of the longitudinally split motor housing about to be moved into assembled relation;

Fig. 3 is a vertical sectional view through the coacting parts of the longitudinally split motor housing with the parts arranged in juxtaposition preparatory for assembly;

Fig. 4 is an end mounting plan view of the coacting parts of a motor housing illustrating the parts about to be assembled;

Fig. 5 is a fragmentary vertical sectional view taken on line 5—5 of Fig. 3;

Fig. 6 is a side elevational view showing the split motor housing assembled on a surface finishing machine;

Fig. 7 is a top plan view of the assembly illustrated in Fig. 6;

Fig. 8 is a vertical sectional view taken through the assembly of Figs. 6 and 7;

Fig. 9 is an enlarged detailed view of one of the molded resilient mounting cups for ball bearings employed in journaling the shaft;

Fig. 10 is a vertical sectional view taken on line 10—10 of Fig. 11 showing the two coacting parts of the motor housing aligned with respect to each other; and Fig. 11 is a transverse sectional view on line 11—11 of Fig. 10.

My invention is directed to a construction of a longitudinally split housing for a rotative apparatus capable of positive alignment of its parts without machining and having resilient support for a shaft and bearings. My invention is exemplified herein by application to a portable surface finishing tool, but my invention is by no means restricted to this type of tool and may be employed generally in rotative apparatus. Accordingly, the embodiments of my invention herein are to be considered in the illustrative sense and not in the limiting sense. In the disclosure herein, I have illustrated an arrangement for the vertical journaling of a rotative shaft with respect to a mounting plate upon which the two parts of the longitudinally split motor housings are erected in juxtaposition, through bosses extending from the lower ends of the split parts of the casing. The parts of the casing are internally recessed at their upper and lower portions and form the housings for resiliently mounted ball races for journaling the rotative shaft. Assembly of the two parts of the casing by means interconnecting said parts results in the positive alignment of the motor field with the rotor and shaft without the machining required in bearing and stator mountings.

Referring to the drawings in more detail, reference characters 1 and 2 designate the two semi-cylindrical coacting parts of the driving motor housing which are connected together adjacent opposite ends by sets of fastening bolts designated at 3 and 4. The parts of the motor housing 1 and 2 are provided with semi-cylindrical aligned recesses shown at 5 and 6 and 7 and 8 in Fig. 3 for receiving the preformed resilient cup-shaped shock absorbing members 9 and 10 as shown more particularly in Fig. 10. The preformed cup-shaped members 9 and 10 adjacent opposite ends of the drive shaft 11 are directed toward each other and serve as resilient carriers for the ball races 12 and 14. The ball races 12 and 14 serve as bearing means for the motor drive shaft 11 which extends through the lower end of the motor housing and beyond the flat mounting plate 15 which supports the parts of the motor housing 1 and 2 by means of screws 16. The upper end of drive shaft 11 terminates beneath the cap member 11a secured in the coacting parts of the motor housing 1 and 2.

The drive shaft 11 carries the motor armature or rotor 17 which operates within the pole pieces of the field structure designated at 18. The exciting windings represented at 19 are arranged within the field structure 18 and the entire field structure so spaced from the interior cylindrical walls 1 and 2 of the motor housing that air may be forced in a cooling path around all of the component parts of the driving motor. This is accomplished by providing on the interior surfaces of the parts 1 and 2 of the motor housing of spacing lug members 21 and 22 which serve as pads and mount the field structure 18 at spaced positions and support the field structure on horizontal ledges 21a and 22a within the motor housing with an air circulating path 23 between the interior walls of the parts 1 and 2 of the motor housing and the exterior surface of the field structure.

An air circulating fan 24 is carried by the drive shaft 11 and is positively driven from drive shaft 11 for circulating air which is drawn through sets of slots 26 in the upper end of the motor housing for discharge through sets of slots 25 in the lower end of the motor housing. The handle 27 which is attached to the part 2 of the motor housing forms a mounting means for the control switch 28 and a passage through which the conductors 29 extend from the driving motor. The conductors 29 with the control switch in series therewith extend through the end of handle 27 as shown at 30 for connection to a plug adapted to be inserted into a power receptacle. Another handle 31 is secured to the top of casing 1 in a position opposite the position of handle 27 as shown in Figs. 6, 7 and 8.

The two semi-cylindrical coacting parts 1 and 2 which constitute the split motor housing are provided with radially extending depending bosses or projections 1a and 2a at the bases of the parts 1 and 2. These bosses 1a and 2a have considerable depth as compared to the thickness of the walls of the parts 1 and 2 and substantially exceed in depth the thickness of the said walls of parts 1 and 2 and are provided with screw-threaded apertures 1b and 2b into which the securing screws 16 extend after passing through aligned apertures represented at 15' in the flat mounting plate 15 as shown in Fig. 6. The bosses or projections 1a and 2a are integrally connected with bosses or projections which are approximately one-half the thickness thereof and which extend normal to the axis of the aforesaid bosses or projections as represented at 1c and 2c. These latter bosses or projections extend substantially diametrically of the parts of the casings 1 and 2 and serve as means for securing the parts of the casing 1 and 2 together by means of the fastening bolts illustrated at 4.

At the top of the parts 1 and 2, there are similar bosses or projections as shown at 1d and 2d extending less than the entire diameter of the motor housing. The bosses or projections 1d and 2d are apertured for the passage of the fastening bolts 3 therethrough. In each instance the bosses or projections 2c and 2d are internally screw threaded and the bolts pass through the aligned apertures in the bosses or projections 1c and 1d and are secured in the screw-threaded apertures in the bosses or projections 2c and 2d. In order to provide ample space for insertion of the securing bolts 3, the tops of the parts 1 and 2 are cylindrically recessed as represented at 1e and 2e. The substantial depth of the bosses or projections 1a and 2a insure the erection of the parts 1 and 2 on the drive mounting plate 15 in a very substantial manner engaged by screws 16. The bosses or projections 1a and 2a and 1c and 2c serve as feet supporting the split motor housing over the drive mounting plate 15 where the feet constituted by the bosses or projections 1a and 2a are secured in an axis coincident with the longitudinal axis of the drive mounting plate but off center with respect to the length thereof.

The handle 27 is secured to one side of the casing 2 through plate 32 which is attached by means of screws 33, 34 and 35 to the external cylindrical wall thereof. Screw 35 is aligned with the projection 2a and extends into a screw threaded aperture 35a in the end thereof for securing the handle 27 in position. The handle 27 is hollow and is so formed that it provides a closure for the cable entrance 36 in the wall of casing 2 as shown more clearly in Fig. 8. Handle 27 has an integrally formed plate 32 thereon which conforms with the exterior surface of casing 2 and forms part of the fastening means for handle 27.

The bosses or projections 1c and 2c and 1d and 2d are provided with semi-cylindrical recesses at the centers thereof to permit the passage of the drive shaft 11. Substantially quadrantal gaps or pockets are formed, as represented at 20, between the bosses or projections 1a and 1c and 2a and 2c, as shown more clearly in Figs. 2, 4 and 6.

The split motor housing of my invention has been found to be highly practical and economical in production and assembly, and while I have described my invention in certain of its preferred embodiments, I desire that it be understood that no limitations upon my invention are intended other than may be imposed by the scope of the appended claims.

What I claim as new and desire to secure by Letters Patent of the United States is as follows:

1. An electric motor housing comprising a flat mounting plate, a housing formed by a pair of substantially semi-cylindrical coacting casings disposed on an axis extending substantially normal to the plane of said flat mounting plate, said casings having projections axially extending from each end thereof, the said projections extending contiguous with each other beyond the limits of the ends of said casings, means extending laterally through the projections at one end of said housing for binding said casings together as a cylindrical assembly, means extending through said flat mounting plate and into certain of said projections at the other end of said housing for uniting said pair of semi-cylindrical coacting casings with said flat mounting plate, journaling means disposed interiorly of said pair of coacting casings and a rotative shaft journaled in said journaling means and extending through said flat mounting plate.

2. An electric motor housing, as set forth in claim 1, in which the means extending through said flat mounting plate and engaging the projections at one end of said housing are substantially parallel with the longitudinal axis of said casings, the last-mentioned projections being disposed in a plane normal to the plane of the projections at the other end of said housing.

3. An electric motor housing as set forth in claim 1, including two separate manually engageable handle devices, one of which connects with the exterior of one of said casings, and the other of which connects with the exterior of the other of said casings.

4. An electric motor housing, as set forth in claim 1, in which a manually engageable handle device is connected with one end of one of said casings and in which a separate manually engageable handle device is connected intermediate the ends of the other of said casings, said last-mentioned handle device including securing means which extend into the end of the projection at the end of the said casing adjacent said mounting plate.

5. An electric motor housing as set forth in claim 1 in which the projections at each end of said housing are disposed substantially diametrically of each of said substantially semi-cylindrical coacting casings and wherein the projections through which the means uniting the pair of semi-cylindrical coacting casings with said flat mounting plate are disposed in planes extending in a direction substantially normal to the planes of all of the aforesaid substantially diametrically extending projections for forming substantially quadrantal pockets intermediate the ends of said casings that terminate adjacent said flat-mounting plate and the plane of said flat mounting plate for providing operating space for assembly and disassembly of means extending laterally through said substantially diametrically extending projections for binding said substantially semi-cylindrical coacting casing together.

6. An electric motor housing as set forth in claim 1 in which the projections on one end of said casing extend lineally for a distance substantially less than the diameter of said casings and wherein the aligned projections at the other end of said casings extend the entire diameter of the said casings.

7. An electric motor housing as set forth in claim 1 in which the projections at the ends of said casings terminating adjacent said flat mounting plate have a depth substantially exceeding the thickness of said walls of said casings and serve as spacing supports between said casings and said flat mounting plate.

8. An electric motor housing as set forth in claim 1 in which one of said casings includes a cable entrance in the side thereof and a hollow handle having a securing plate thereon attached to the exterior of said casing and wherein said hollow handle extends over and forms a protective cover for said cable entrance.

References Cited in the file of this patent

UNITED STATES PATENTS

| | | |
|---|---|---|
| 459,024 | Short | Sept. 8, 1891 |
| 1,152,683 | Williamson | Sept. 7, 1915 |
| 1,323,626 | Garman | Dec. 2, 1919 |
| 2,098,073 | Tucker | Nov. 3, 1937 |
| 2,451,650 | Atkin | Oct. 19, 1948 |
| 2,464,816 | Koch | Mar. 22, 1949 |